Jan. 8, 1963 AKIHIKO SATO 3,072,803

TRANSISTOR UTILIZING A LONGITUDINALLY DIRECTED MAGNETIC FIELD

Filed Nov. 13, 1959

INVENTOR
AKIHIKO SATO
BY
Mitchell & Bechert
ATTORNEY

United States Patent Office 3,072,803

Patented Jan. 8, 1963

3,072,803

TRANSISTOR UTILIZING A LONGITUDINALLY DIRECTED MAGNETIC FIELD

Akihiko Sato, Tokyo, Japan, assignor to Nippon Electric Company Limited, Tokyo, Japan, a corporation of Japan Filed Nov. 13, 1959, Ser. No. 852,657
5 Claims. (Cl. 307—88.5)

This invention relates to a transistor, and more particularly to a transistor construction capable of improving the current amplification factor.

In the transistor field it is generally understood that a transistor is not an ideal amplifier element, because its current amplification factor is less than unity. Further, the amplification factor is dependent upon frequency, decreasing as the frequency increases. The main reason for this is considered to be the surface recombination of minority carriers that occurs around the emitter electrode of a transistor.

Chemical techniques have been developed for minimizing surface recombination; the results, however, have been unsatisfactory.

Accordingly, it is a primary object of the invention to increase the amplification factor of a transistor, and to improve the frequency characteristics thereof.

The object is attained, according to the invention, by a novel concept of applying a magnetic field to a transistor so as to focus the streams of the minority carriers in the transistor, for purposes of preventing the minority carriers from diffusing toward the surface of the transistor, and preventing the stream lines of the minority carriers from diverging.

According to the invention, there is provided a transistor wherein the streams of the minority carriers in said transistor are controlled by means of a magnetic field which is produced by an electric current flowing either through one of the electrodes of said transistor or through an electrode specially provided for that purpose on a surface of the transistor.

A preferred embodiment and a modification, as applied to junction transistors, will be explained hereinafter with reference to the accompanying drawings, in which:

FIGS. 1 and 2 schematically show a plan view of an embodiment of this invention, and a sectional view taken along lines 2—2 of FIG. 1, respectively;

Figure 7:
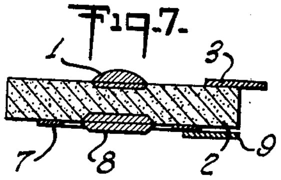
Figure 8:
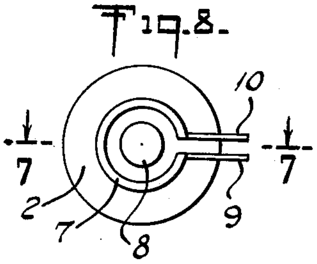
Figure 9:
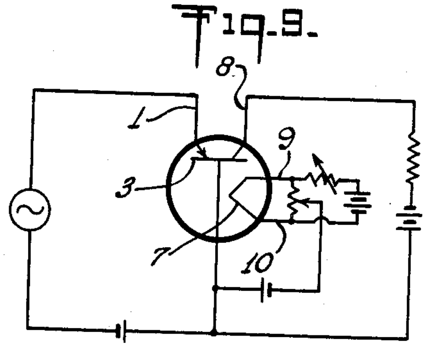

FIGS. 7 and 8 schematically show a sectional view of a modified embodiment of the invention and a bottom view thereof, respectively;

FIG. 9 is an example of an electrical connection for the modification shown in FIG. 7.

Figure 1:
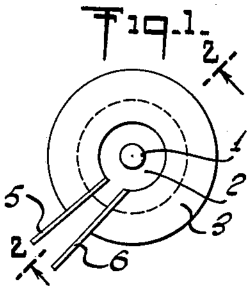
Figure 2:
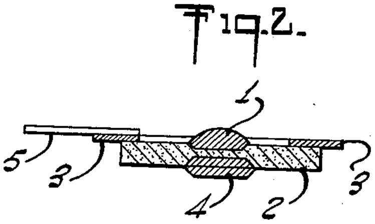

Now referring to FIGS. 1 and 2, there is shown a transistor according to the invention, which comprises a semiconductor body 2 having an emitter electrode 1, a base lead 3, and a collector electrode 4. The base lead 3 is of a segmented annular shape having a cut-away portion or a slot extending radially of the base lead 3. Two base-lead wires 5 and 6 are attached to the opposing ends of the base lead 3, as shown in FIG. 1. Since the base-lead wires 5 and 6 are electrically connected to both ends of the base lead 3, a direct-current can be caused to flow from one of the base-lead wires, through the base lead 3, to the other base-lead wire. A magnetic field may thereby be generated in the same direction as the direction of the electric current or streams of electric charges formed by the moving or migrating minority carriers.

Figure 3:
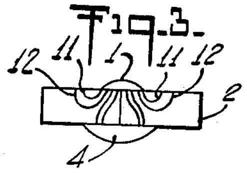
FIGS. 3 and 4 show distribution of stream lines of the minority carriers in a conventional transistor, and a transistor of this invention, respectively.
Figure 4:
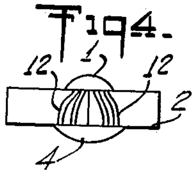

In the absence of the magnetic field, stream lines such as 11 and 12 of the minority carriers recombine or are directed back to the emitter side of the transistor, as seen in FIG. 3. When the transistor is subjected to a magnetic field, the stream lines are directed towards the collector side, as shown in FIG. 4. The surface recombination, therefore, near the emitter electrode 1, or the return of the minority carriers toward the emitter electrode 1, is materially reduced, and the divergency of the stream lines is also reduced. Thus, the current amplification factor approaches unity and the phase characteristics thereof are improved.

It is now well known that the cut-off frequency of a transistor is more a function of the phase characteristics than of the current amplification factor. By improving the phase characteristics and the current amplification factor, a very significant and material improvement of the cut-off frequency for current amplification is achieved.

Figure 5:
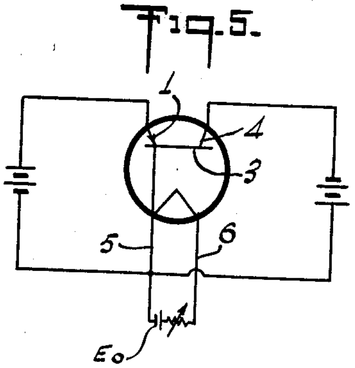
FIGS. 5 and 6 are examples of electrical connections for a transistor operating in accordance with this invention.
Figure 6:
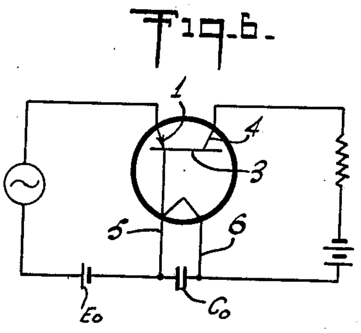

The electric current for generating the magnetic field may be supplied to the base lead 3 from a separate power supply $E_o$, as shown in FIG. 5. The electric current may alternatively be the collector or emitter current itself. For example, in FIG. 6 the collector current is utilized for producing the magnetic field. In this figure, $C_o$ is a high-pass capacitor.

In the embodiment described hereinafter, the base lead 3 is employed as the electrode for producing the magnetic field. However, in certain semiconductor configurations the electric current may in addition, or alternatively, be passed through the emitter or the collector electrode. In certain high power transistors which have recently been developed, the emitter electrode is of annular shape. In such transistors the electric current may be caused to pass through the emitter electrode.

Referring now to FIGS. 7 and 8, there is shown a transistor comprising an additional or fourth electrode 7 for carrying the electric current which generates the desired magnetic field. In this modification, the fourth electrode 7, of electrically conductive material, is attached around the collector electrode 8 to the semiconductive body 2. The fourth electrode 7 is of an incomplete annular shape including two terminal wires 9 and 10 attached to the opposing ends of the annular electrode 7. The fourth electrode 7 may be welded or bonded to the semiconductor body 2 by any suitable bonding material, which may be insulating material. By passing an electric current through the electrode 7, a magnetic field is produced in the desired direction to reduce the minority carrier recombination.

FIG. 9 shows an example of an electrical connection for the four-electrode transistor; the fourth electrode 7 being held somewhat below the potential of the base electrode 3 of the transistor. Although it might be thought that the minority carriers injected by the emitter 1 are attracted to the fourth electrode 7, experience has shown that the magnetic field, in focusing the stream lines, produces a condition relatively unaffected by this suggested problem.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A transistor comprising a semiconductor body having a plurality of electrodes, one of said electrodes being of segmented annular shape surrounding a second of said electrodes, first and second electrical conductors connected respectively to the ends of the segmented annular electrode, whereby, when an electric current is produced in said conductors a magnetic field is generated through said body in the same direction as the direction of the minority carrier stream lines in said body, thereby reducing the divergence of said stream lines and the recombination rate of the minority carriers.

2. A transistor comprising a semiconductor body having a plurality of electrodes, one of said electrodes being of segmented annular shape surrounding a second of said electrodes, first and second electrical conductors connected respectively to the ends of the segmented annular electrode, and means for producing an electric current in said conductor to generate a magnetic field through said body in the same direction as the direction of the minority carrier stream lines in said body thereby reducing the divergence of said stream lines and the recombination rate of the minority carriers.

3. The transistor according to claim 2, wherein said semiconductor body has base, emitter and collector electrodes, said base electrode is in the shape of a segmented annulus surrounding said emitter electrode, and said means comprises a source of electric energy of the direct-current type coupled to said base electrode through said connectors for generating current therethrough in a direction for producing said magnetic field.

4. The transistor according to claim 2, wherein said semiconductor body has base, emitter and collector electrodes and a fourth electrode, said fourth electrode is in the shape of a segmented annulus surrounding said collector electrode, and a source of electric energy of the direct-current type coupled to said fourth electrode for generating current therethrough in a direction for producing said magnetic field.

5. The transistor according to claim 2, wherein said semiconductor body has base, emitter and collector electrodes, said base electrode is in the shape of a segmented annulus surrounding said emitter electrode, and said means comprises a circuit component for directing current through said base electrode from one of the other electrodes.

References Cited in the file of this patent

UNITED STATES PATENTS

| | | |
|---|---|---|
| 2,702,316 | Friend | Feb. 15, 1955 |
| 2,733,359 | Brown | Jan. 31, 1956 |
| 2,869,001 | Welker | Jan. 13, 1959 |
| 2,907,897 | Sander | Oct. 6, 1959 |